United States Patent [19]

West et al.

[11] 4,310,421

[45] Jan. 12, 1982

[54] REUSE OF WASTE WATER IN BATTERY MANUFACTURE

[75] Inventors: Jon K. West; Kenneth LeDuc; Serge Ferrus, all of Gainesville, Fla.

[73] Assignee: General Electric Company, New York, N.Y.

[21] Appl. No.: 192,153

[22] Filed: Sep. 29, 1980

[51] Int. Cl.³ .............................................. C02C 5/02
[52] U.S. Cl. .................................... 210/740; 210/765; 210/96.1; 210/205; 134/18
[58] Field of Search ............... 210/740, 743, 749, 765, 210/46.1, 199, 205, 206; 134/18

[56] References Cited

U.S. PATENT DOCUMENTS

| | | | |
|---|---|---|---|
| 1,943,684 | 1/1934 | Martin et al. | 210/743 X |
| 3,714,039 | 1/1973 | Lancy et al. | 210/743 |
| 3,715,308 | 2/1973 | Sulfano | 210/743 |
| 4,226,714 | 10/1980 | Furness et al. | 210/740 |

*Primary Examiner*—John Adee
*Attorney, Agent, or Firm*—Pollock, Vande Sande & Priddy

[57] ABSTRACT

A battery manufacturing operation employs a first NaOH solution for washing an intermediate product generating a waste caustic, and a second NaOH solution for impregnation. In addition, quasi-periodically a fixed quantity of waste wash water is available. The invention includes a process, and an apparatus for carrying out the process, for using the waste wash water as one component of the second NaOH solution, to which is automatically added fresh NaOH until a specific NaOH solution (25% NaOH), by weight is obtained. Thereafter, the waste caustic is added resulting in the second solution. The process is effected typically automatically notwithstanding variations in the components of the waste water, and normal variations in the flow rates, etc.

10 Claims, 8 Drawing Figures

REUSE OF WASTE WATER IN BATTERY MANUFACTURE

FIELD OF THE INVENTION

The present invention relates to a process and apparatus for carrying out the process, of reusing waste water in the manufacture of nickel cadmium batteries; particularly the reuse of that waste water as a component in producing a sodium hydroxide solution which is employed in one step in the process of nickel cadmium battery manufacture.

BACKGROUND OF THE INVENTION

A method of manufacturing nickel cadmium batteries which is now in commercial use, is generally characterized by starting with metal plate material, which (after processing) will form the battery electrodes, cleaning the plates in a caustic (NaOH) solution, impregnating the plate material with nickel, both by sintering and then by immersing the sintered material in a heated solution of nickel nitride and sodium hydroxide; and then washing the impregnated plates with heated distilled water to remove excess material including nickel nitride, sodium hydroxide and sodium nitride.

Once the impregnated material has been washed, the used wash water obviously carries with it impurities which will make it unsuitable for human consumption, and therefore in order to comply with environmental regulations, the water must be treated before it is discharged. Since this treating is ancillary to battery production it is desirable to minimize the economic impact of this waste water processing. One method which is now in use for minimizing the economic impact of this requirement for waste water processing is disclosed in co-pending application Ser. No. 162,544, filed June 24, 1980, incorporated herein by reference, and assigned to the assignee of this application; briefly stated, in accordance with the referenced application multiple sources of a wash medium are provided with progressively increasing impurity concentrations. Washing is effected in a number of wash steps equal to the number of different sources employed; sequential washing steps employing a wash medium of progressively decreasing impurity concentration. While this technique has the advantage of significantly reducing the quantity of wash medium required for a given quantity of batteries, it does not eliminate entirely the necessity for processing of waste wash water, since even with the cascaded washing disclosed in the aforementioned application, there comes a point at which the impurity concentration of the wash media inhibits further effective washing.

The aforementioned process for manufacture of nickel cadmium batteries, includes, as stated above, a requirement for sodium hydroxide solution, used in the impregnation step. In particular, a need exists for a sodium hydroxide solution of about 25% by weight. Providing this solution is effected by mixing more concentrated sodium hydroxide (in one embodiment, 50%) with water; and since the impregnation step requires sodium hydroxide solutions at elevated temperatures, it may also be necessary to heat the solution.

SUMMARY OF THE INVENTION

In accordance with the instant invention, waste water from the washing step is employed as one component of the sodium hydroxide solution thereby providing a number of advantages in the production of batteries. First, the use of this waste water in further processing steps significantly reduces the quantity of waste water which must be processed for disposal, thus significantly reducing the economic impact of ancillary procedures. Furthermore, since the waste water discharged from the washing operation is already heated, the requirement for the addition of heat to the sodium hydroxide solution is either eliminated or reduced significantly, thus also saving some of the energy expended in heating the wash medium. Finally, the waste water which is reused in producing the sodium hydroxide solution includes sodium and nitrides, the re-use of this water in the sodium hydroxide solution maintains it available for recovery, and equally important, actually increases the concentration of these materials at the conclusion of the impregnating step, thus also reducing the cost of recovering the same.

Because battery manufacture employs process components and parameters such as caustic or corrosive agents, high temperatures, heavy metals in solution, and elevated temperatures, the prior art in battery manufacture has recognized the difficulty with which automation of such processes can be effected. Notwithstanding the foregoing, however, the process, and the apparatus disclosed hereinafter for carrying out the process, are arranged for essentially substantially automatic operation, and attain these goals with apparatus requiring a minimum of maintenance and even less human supervision. Furthermore, the step of washing the pre-impregnation step plate with caustic produces waste caustic of approximately the appropriate solution. Therefore, after a new solution is properly mixed, this waste caustic is added to further reduce the requirement for the impregnation step solution.

Among the variables the automatic apparatus has to contend with is the variability of the waste water in its impurities, and thus the necessity to mix more or less fresh NaOH to achieve the desired NaOH solution, the variability in rate of use of the resulting solution and thus, the possibility that more or less product of a previous cycle remains in the mixing tanks, as well as the expected variations in flow rates of solution components and the variability in the time required to adequately mix the components.

Thus, in accordance with one aspect of the invention, a method is provided for use in the process of battery manufacture, which battery manufacture includes the step of washing a partially completed battery component with water and which also includes a further step employing a sodium hydroxide solution, the improvement comprising a method of reusing waste water from the washing step, comprising the automatic steps of:

(a) transferring a determined quantity of said waste water to a mix tank;

(b) adding a determined quantity of a sodium hydroxide solution;

(c) circulating the contents of said mix tank for a predetermined time:

(d) monitoring specific gravity of the mix tank contents after circulating the contents of the mix tank for a fixed period of time;

(e) selectively adding a further determined quantity of sodium hydroxide solution or waste water if said monitored specific gravity is not within a selected range, or, (f) transferring said mix tank contents to a source of battery treatment sodium hydroxide solution if said monitored specific gravity is within said selected range, and
(g) repeating said steps (e), (c) and (d) each time said step (d) indicates that said specific gravity is not within said selected range.

Another aspect of the invention comprises an apparatus for reusing waste water generated in a battery manufacturing process which includes a plurality of sources of wash media of differing impurity concentration sequentially tapped to fill a plurality of wash tanks and from at least one of said sources a fixed quantity of waste water is discharged, on a quasi-periodic basis, comprising:
(a) a mix tank,
(b) first means responsive to the availability of said discharged waste water for transferring a determined quantity to said mix tank,
(c) second means, responsive to said first means for transferring a determined quantity of a caustic solution to said mix tank,
(d) mixing means responsive to said second means for mixing the contents of said mix tank,
(e) specific gravity monitoring means for signalling the attainment of specific gravity in said mix tank within a determined range,
(f) transfer means, responsive to attainment of a specific gravity within said determined range for, on demand, transferring at least some of the contents of said mix tank to a source tank,
(g) timing means initiated by energization of said mixing means for marking the termination of a fixed period of time,
(h) fresh water supply means,
(i) fresh NaOH supply means,
(j) selection means, responsive to expiration of said fixed period of time in the absence of said signal from said specific gravity monitoring means for enabling a one or the other of said fresh water supply means or said fresh NaOH supply means, and
(k) means responsive to operation of said selection means for resetting said timing means and for energizing said mixing means.

BRIEF DESCRIPTION OF THE DRAWINGS

Specific embodiments of the present invention will be described in the following portions of the specification when taken in conjunction with the attached drawings in which like reference characters identify identical apparatus and in which.

DESCRIPTION OF PREFERRED EMBODIMENTS

Figure 1:
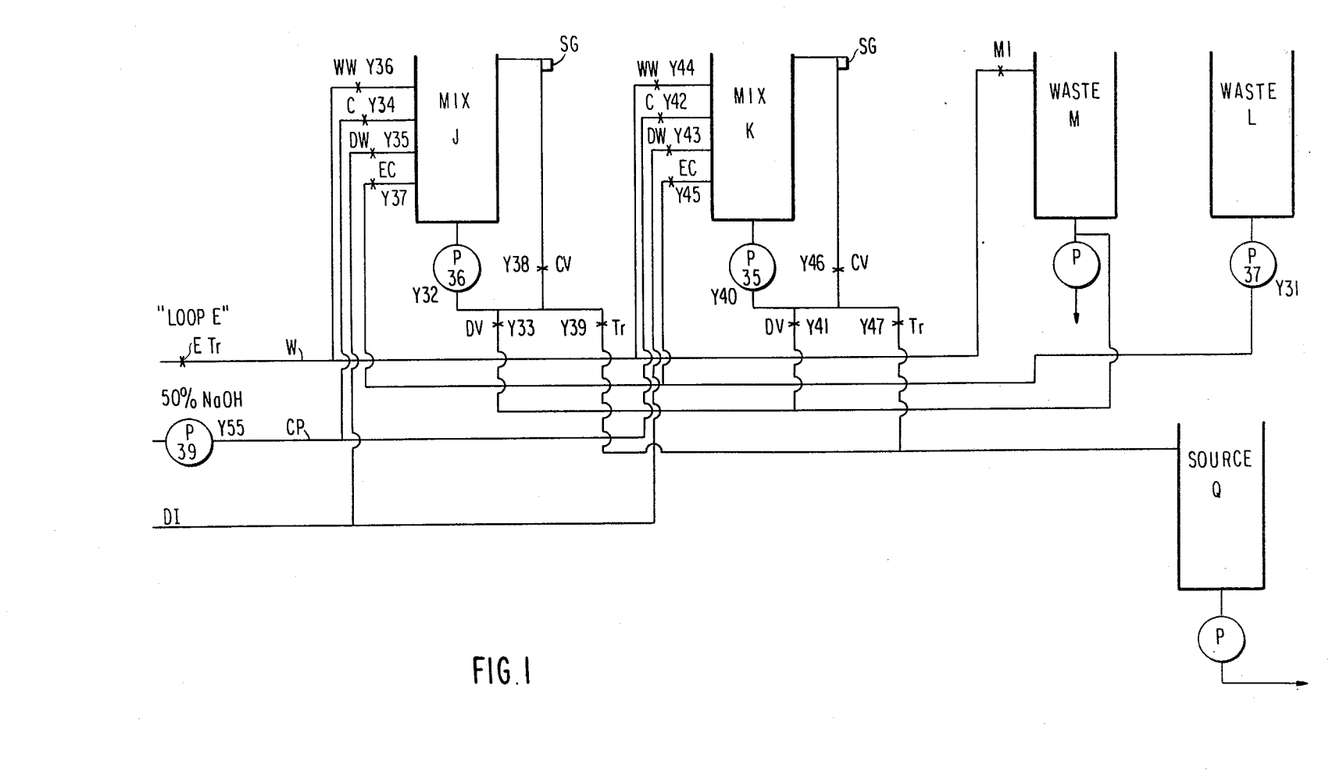
FIG. 1 is a schematic of the mixing and associated tanks along with the associated piping, valving and pumping apparatus employed in an embodiment of the invention.

FIG. 1 is a schematic layout of a portion of the apparatus employed in a battery manufacture process which apparatus is more particularly concerned with mixing used or waste wash media (hereinafter waste water) with a caustic solution (50% NaOH) in order to generate a different caustic solution (25% NaOH) for use in a further step of battery manufacture. FIG. 1 illustrates five different tanks, a pair of mixing tanks J and K, a waste water tank M, a waste caustic tank L and a source of mixed sodium hydroxide solution tank Q. Interconnecting the various tanks are various pipes and associated pumps and valves. More particularly, a six inch diameter pipe W is connected to the "loop E" transfer valve ETr. The valve shown in FIG. 1 as ETr is the E loop valve Tr shown in FIG. 1A of the referenced application and is in the drain path of a source of wash media of highest impurity concentration. A T-joint in the pipe W feeds valve KWW which provides an inlet to the K tank. The W pipe terminates at valve M1 which provides an inlet to tank M.

An outlet of tank L is coupled through a pump P37 into a pipeline which has a T-joint feeding valve KEC (waste caustic), which provides a second inlet to tank K. The pipeline from P37 continues past the mentioned T-joint and terminates in valve JEC, providing another inlet to tank J.

A two inch pipe carrying fresh deionized water (DI) is coupled to a T-joint, which feeds valve JDW (deionized water) which provides a third inlet to the tank J. The pipe DI continues and terminates in valve KDW, which provides a third inlet to tank K.

A pipe CP (3 inches in diameter) is coupled through a pump P39 to a T-joint which feeds valve JC (caustic) which provides a fourth inlet to the tank J. The pipe CP continues and terminates in a valve KC, which provides a fourth inlet to tank K.

An outlet from tank J, coupled to a piping loop, including a pump P36, the outlet of which is coupled to a T-joint feeding valve JDV (drain), the outlet of which is coupled via another pipe to the inlet of pump P, also coupled to the outlet of tank M. The T-joint to which valve JDV is coupled is also coupled to a further T-valve, one of whose outlets is coupled to valve JCV (circulate valve) whose outlet provides a fifth inlet to tank J. The remaining outlet of the last mentioned T-joint is coupled to a valve JTR (transfer), whose outlet is coupled to a pipe providing an inlet to tank Q. A similar arrangement is provided at tank K which employs pump P35.

In brief compass, the tanks J and K are used alternately for mixing purposes, thus when tank J is empty and available for mixing, tank K which has just completed a mixing operation is therefore full. When a cycle starts, waste water is coupled via pipe W to either valve JWW or KWW, depending upon which tank is empty. In an embodiment of the invention which has been constructed, the pipe W typically carries, in any cycle, 15,000 gallons of water, each of tanks J and K are to be filled with 5,000 gallons of water, and the remaining 10,000 gallons flows through valve M1 to the tank M.

Obviously, depending on process parameters, the volume of available waste water and the amount used in mixing, in any cycle, are subject to wide variations. Thus filling in tank J is terminated based on a predetermined level of waste water indicated by a first level sensor. Fresh caustic is then transferred through pump P39 and the attached piping to either valve JC or KC. This transfer is controlled by a second level sensor, and terminated when a predetermined quantity of fresh caustic has been added. In one embodiment of the invention 4700 gallons of 50% NaOH are added.

When the predetermined quantities of waste water and caustic have been added to the appropriate tank, a mixing operation ensues driven by the appropriate pump, either pump P36 or P35, and to effect this the valve CV is opened. At the conclusion of a predetermined amount of mixing time, the specific gravity of the mixture is determined. The device employed to monitor the specific gravity is located in the piping path coupling the valve CV to the tank, carries the reference character SG in FIG. 1, and is more completely disclosed in co-pending West application (60-BA-158), application Ser. No. 191,209, filed Sept. 26, 1980 (incorporated herein by reference) and assigned to the assignee of this application.

This specific gravity monitor includes several pairs (at least two) of contacts which are normally open, and close in succession in response to increasing levels of specific gravity. In connection with J tank those pairs of contacts are connected to input channels X52, and X51.

Thus a low specific gravity is indicated by no closed contacts. A proper specific gravity is indicated by X52 closed and X51 open, and high specific gravity is indicated X52, and X51 closed. If X51 only is closed, a failure is indicated. A predetermined range of specific gravities has been established at nominally 1.4 for a solution which is appropriately mixed for subsequent use. In the event that the specific gravity determined by SG is outside this range, either too low or too high, fresh caustic comprising a 50% sodium hydroxide solution is added, or fresh deionized water is added; from the pipe CP (for sodium hydroxide solution) or the pipe DI (fresh deionized water). Thus, depending upon the results of the measurement effected by SG, either the valve C or the valve DW will be opened. Depending on the specific gravity and tank in use either one or the other valve is opened for a sufficient time, selected in accordance with the flow rate in the appropriate pipe, so that the specific gravity is nominally changed by 0.01. Following this addition, the contents of the tank are again circulated for a fixed time, and the measurement is again effected. This operation continues for a number of cycles, each cycle concluding with a different measurement.

The switches of the specific gravity monitor (X52,X51 for tank J) respond to pressure and can be set to close at any pressure in the range 0–15 psi. They are calibrated manually so that one is closed, and the other open, at a pressure which is produced by a solution of 230–235 grams of NaOH per liter. This corresponds to a specific gravity of approximately 1.4.

Whenever the measurement indicates the specific gravity of the solution is in the desired range, additional waste caustic is added to the tank J via valve EC up to a specific level, determined by a third level sensor.

The waste caustic has a specific gravity which can vary but typically has about 215 grams of NaOH per liter, i.e., a slightly lower specific gravity than that used to signal appropriate mixing. Accordingly, the addition of waste caustic actually drops the specific gravity of the resulting solution by a small amount. If necessary, this can be taken into account when calibrating the tripping point of X52, for example, so that it trips slightly above the desired low point of the allowed range. In this fashion the addition of waste caustic will not drop the specific gravity below the allowed range. Following that addition, circulation of the solution in the tank continues, and on demand the solution is available via the valve JTR. When the tank is emptied (indicated by a further level sensor, X41, for tank J) the pump P36 is deenergized and the cycle has concluded. Tank J is then available for a further mixing operation.

In the event that automatic addition of either caustic of deionized water fails to bring the solution within the desired range, manual operation is called for via appropriate indicators, and the operator has available to him controls to effect adjustment of the specific gravity by the further addition of 50% sodium hydroxide or deionized water. After further circulation specific gravity is again monitored.

The specific proportions of the initial charge of wash water and caustic are designed to ensure a bias favoring low specific gravity after the initial charge. Accordingly, the most probable automatic adjustment is the addition(s) of caustic. To ensure the time consumed in mixing is compatible with other process parameters, the sequence monitors the number of automatic caustic adjustments and limits them to three; after which manual operation is required. Automatic water adjustments are only limited by the level sensor in the tank being used.

As described in the first referenced application the battery production facility is comprised of a plurality of production lines, each including a single wash tank, the set of wash tanks are supplied by wash media from a plurality of supply loops in successive order, each of the loops containing wash media of decreasing impurity concentration. The impurity concentration in a least one of the loops is monitored, and when it reaches a predetermined impurity concentration level a cascading operation is effected wherein the loop having highest impurity concentration is exhausted, and the contents of each of the other loops moves to the adjacent loop, and the loop having wash media of lowest impurity concentration is filled with fresh wash media (deionized water). Since this operation depends upon the rate at which impurity concentration is added to the wash media, the cascading is not effected on a timed basis. Since the apparatus shown in FIG. 1 operates on the waste water exhausted during a cascade, the mixing operation likewise does not operate on a timed basis, but actually is initiated each time a cascade of the contents of the various loops is effected. Each of the heretofore mentioned valves and pumps are controlled by a control system which includes a programmable sequencer which, in an embodiment which has been constructed is a Model 5 Texas Instruments Programmable Sequencer, although as described in the referenced application, the use of the programmable sequencer used in the embodiment which has been constructed is not essential to the invention so long as the appropriate logical functions are effected, and these functions can be effected by the use of commercially available microprocessors, minicomputers or main frame computers. In addition, while each of the aforementioned devices are software controlled, the use of a software controlled processor is also not essential to the invention and the logical functions could also be implemented by relay circuits or discrete logic electronic circuits. In any event, the input to the logical process is determined by a plurality of sensors. Insofar as this invention is concerned those sensors are level sensors, the specific graviity monitor mentioned above and the state of other process conditions. The results of the logical process are control signals which are used to control various valves and pumps. In this vein, each of the pumps and valves which must change its condition in the course of the mixing process heretofore described, has, in addition to the reference characters already referred to, a channel number, i.e., Y31-Y35, for example. Each channel number identifies a different output (or input) from (or to) the logical process. Channel numbers including Y refer to output channels, those with X refer to an input channel.

Each of the production lines already mentioned includes two distinct processes which employ caustic solutions, a first of theses processes is an impregnation, employing a sodium hydroxide, nickel nitride solution; the second of these processes is a cleaning operation employing a sodium hydroxide solution. The waste caustic accumulated in tank L is derived from solution discharged from the cleaning operation; and this solution is used, as described, as one component of the mixing process, the result of which becomes one component of the solution employed in the impregnation process.

Figure 2:
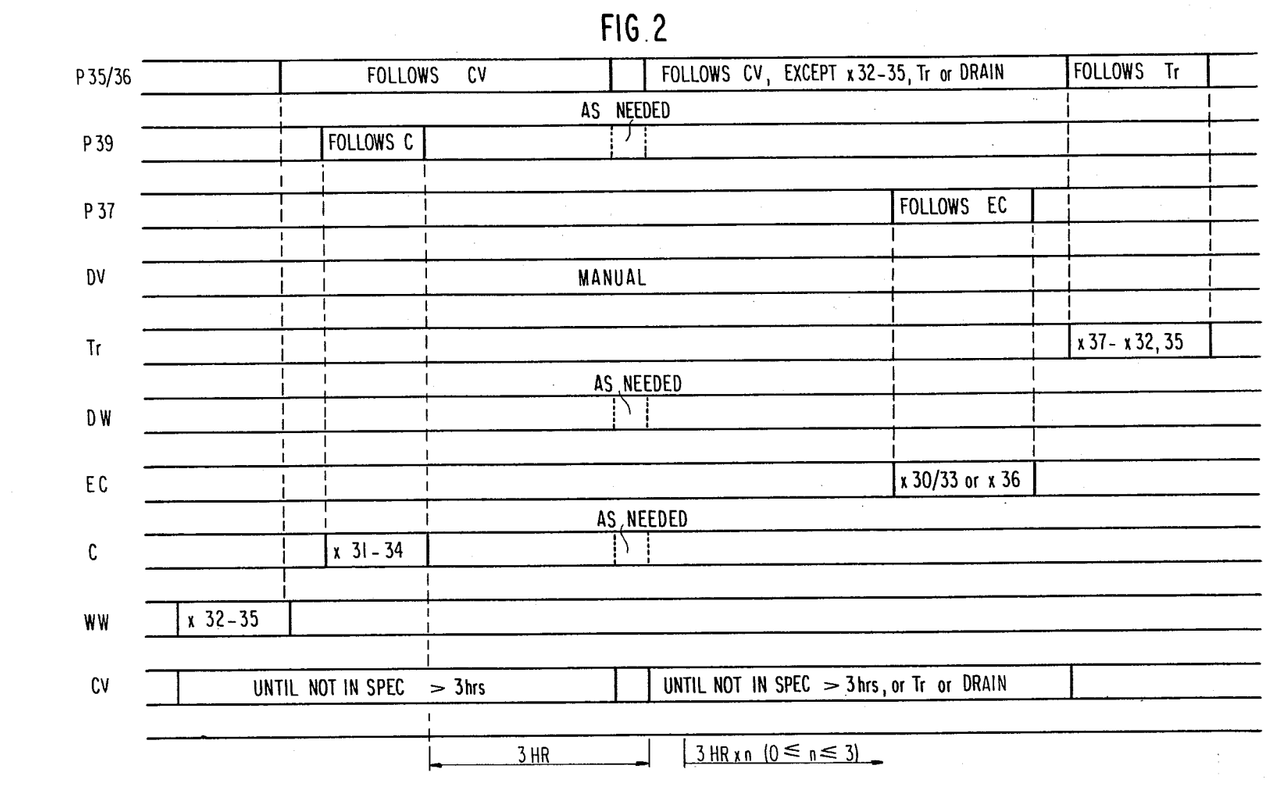
FIG. 2 is a timing chart illustrating a typical operating sequence of valves and pumps shown in FIG. 1.

FIG. 2 is a timing diagram illustrating the time sequential operation of the various valves and pumps mentioned above; the abcissa is time.

FIG. 2 shows a typical sequence for one of the mix tanks. It should be understood that once a mix tank is filled with an appropriately mixed solution, the contents are transferred, on demand to the source tank Q. Accordingly, this transfer may, and usually does, overlap in time with the mixing in the other of the two mix tanks. However, the single process controller is effective to simultaneously control both the mixing phase in one tank, and the transfer phase, in another tank.

Figures 3, 4, 5:
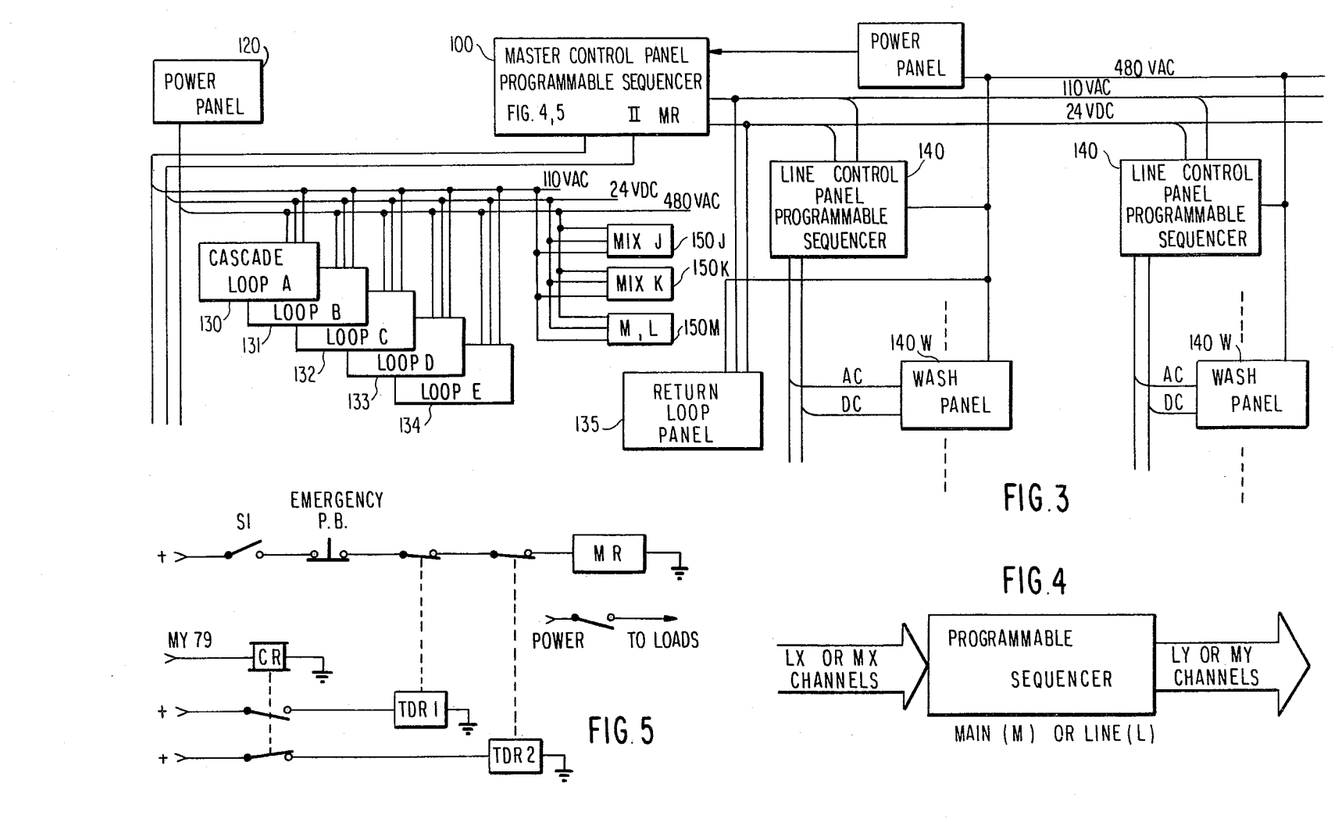
FIG. 3 is an electrical schematic of the organization of the control apparatus.
FIG. 4 represents the programmable sequencer which is a component of the master control panel 100 of FIG. 3.
FIG. 5 is a schematic of a portion of the circuitry in the master control panel 100 of FIG. 3.
Figure 6:
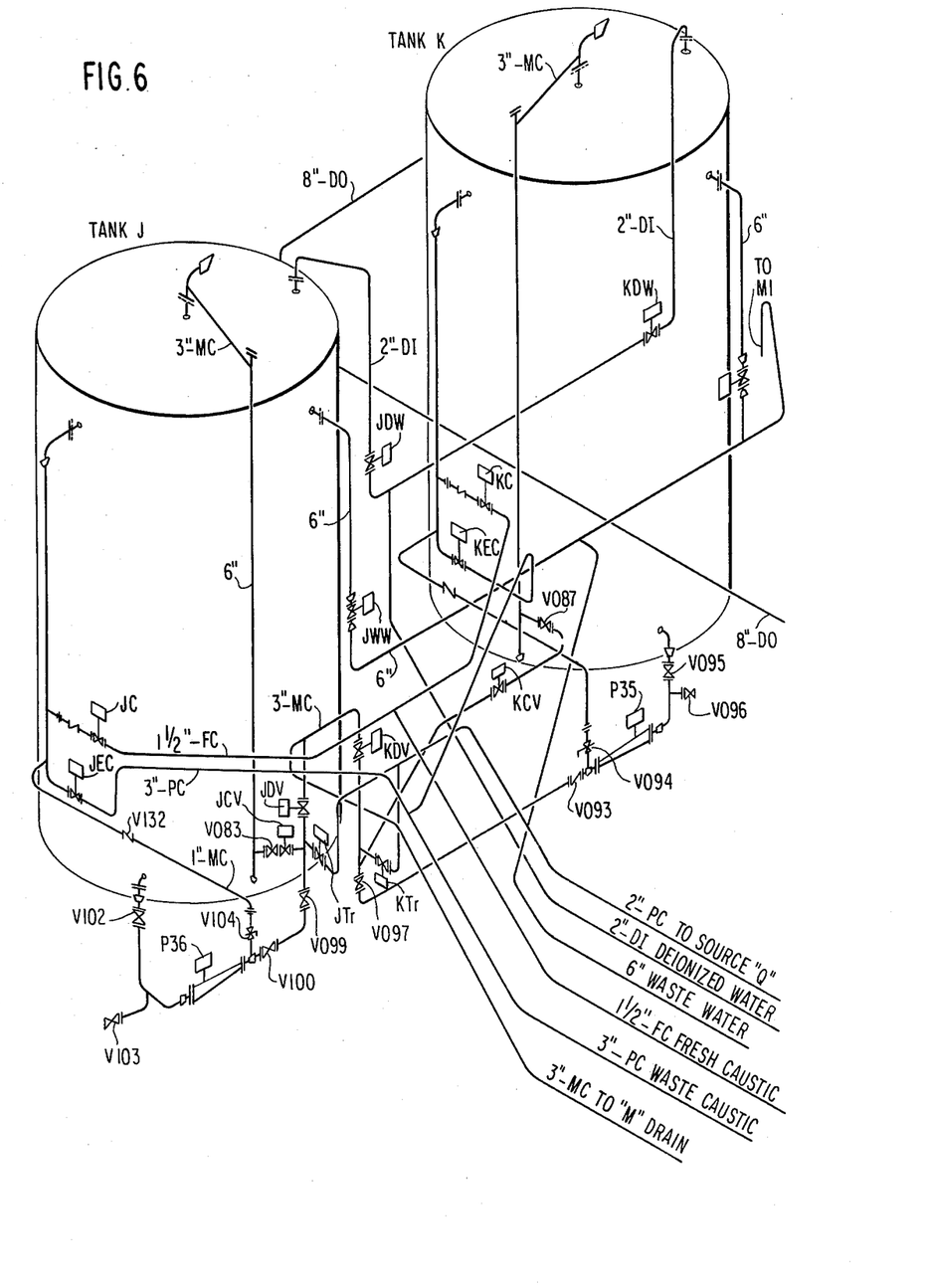
FIG. 6 is an isometric view of the two mixing tanks J and K, with the associated piping and valving.

FIGS. 3-5 illustrate the control arrangement; FIG. 3 is identical to FIG. 3 of the referenced application except that the control panel for the mix tanks J and K, 150J and 150K are illustrated along with tank M/L panel 150M. FIGS. 4 and 5 are identical to those Figures in the referenced application. Each panel (150J,150K,150M) provides a physical mounting for connector blocks to connect the input and output channels to/from the associated sensors, pumps and valves. FIG. 6 is an isometric layout of the mix tanks J and K and the associated pumps, valves and piping.

The master control panel 100 includes a programmable sequencer (shown in FIG. 4) which has a plurality of sensors as inputs, and provides a plurality of control signals at its output; the output lines are identified as 110 volt AC and the input lines are identified as 24 volt DC. Each sensor input is coupled to a different input terminal or channel, the specific input (relevant to the invention) and their associated channels are identified in Table I, below.

TABLE I

| INPUT CHANNEL | SENSORS |
|---|---|
| X10 | Mix Tank J Panel Power |
| X11 | Mix Tank K Panel Power |
| X12 | Mix Tank L,M Panel Power |
| X30 | Mix Tank J High Level |
| X31 | Mix Tank J Caustic Level |
| X32 | Mix Tank J Wash Level |
| X33 | Mix Tank K High Level |
| X34 | Mix Tank K Caustic Level |
| X35 | Mix Tank K Wash Level |
| X36 | Waste Caustic Tank L Low Level |

TABLE I-continued

| INPUT CHANNEL | SENSORS |
|---|---|
| X37 | Source Caustic Tank Q |
| X41 | Mix Tank J Low Level |
| X42 | Mix Tank K Low Level |
| X48 | Manual Drain PB Tank J |
| X49 | Mix Tank J Caustic PB |
| X51 | Mix Tank J High S.G. |
| X52 | Mix Tank J Low S.G. |
| X53 | Mix Drain PB Tank K |
| X54 | Mix Tank K Caustic PB |
| X55 | Mix Tank K Water PB |
| X56 | Mix Tank High S.G. |
| X57 | Mix Tank Low S.G. |
| X60 | Mix Tank J In S.G. PB |
| X61 | Mix Tank K In Spec S.G. PB |

Table II, reproduced below identifies the various output channels, used in connection with the mixing operations of the present invention, and the devices those output commands operate.

TABLE II

| OUTPUT CHANNEL | DEVICE |
|---|---|
| Y27 | Loop E Pump |
| Y31 | Waste Caustic Pump P37 |
| Y32 | Tank J Pump P36 |
| Y33 | Tank J Drain Valve Dv |
| Y34 | Tank J Caustic Valve C |
| Y35 | Tank J DI Valve |
| Y36 | Tank J Waste Water Valve WW |
| Y37 | Tank J Waste Caustic Valve EC |
| Y38 | Tank J Circulate Valve |
| Y39 | Tank J Transfer Valve Tr |
| Y40 | Tank K Pump P35 |
| Y41 | Tank K Drain Valve DV |
| Y42 | Tank K Caustic Valve C |
| Y43 | Tank K DI Valve |
| Y44 | Tank K Waste Water Valve WW |
| Y45 | Tank K Waste Caustic Valve EC |
| Y46 | Tank K Circulate Valve CV |
| Y47 | Tank K Transfer Valve Tr |
| Y55 | Fresh Caustic Pump P39 |
| Y72 | Manual Operation Req'd |
| Y73 | Tank J High Level (Flashing-Probe Fail) |
| Y74 | Tank J in Spec (Flashing-not in Spec) |
| Y77 | Tank K High Level (Flashing-Probe Fail) |
| Y78 | Tank K in Spec (Flashing-Not in Spec) |

Generally, the outputs are normally at one voltage level (for example, a low level) resulting in the controlled element, (i.e., valve or pump) being off or closed; but when the output channel potential is in its other state (for example, a high voltage state) then the controlled element (a valve or pump) is operated or energized. The sole exception to this convention is the circulate valve CV (corresponding to channel Y38 and Y46 for tanks J and K, respectively) in which case the valve in open when the channel is in its low voltage state and is closed when the channel is in its high voltage state.

Figure 7A:
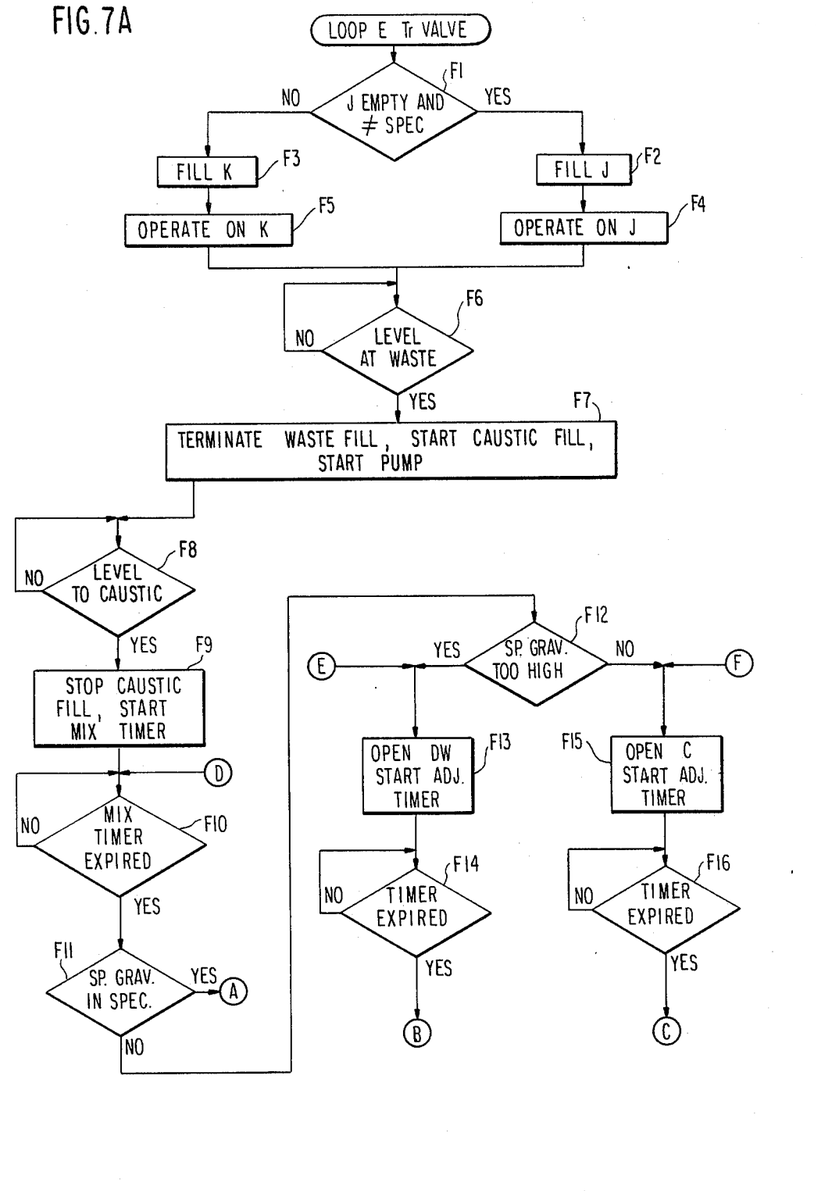
FIGS. 7A and B are a flow diagram of the operating sequence stored in the programmable sequencer of FIG. 4.
Figure 7B:
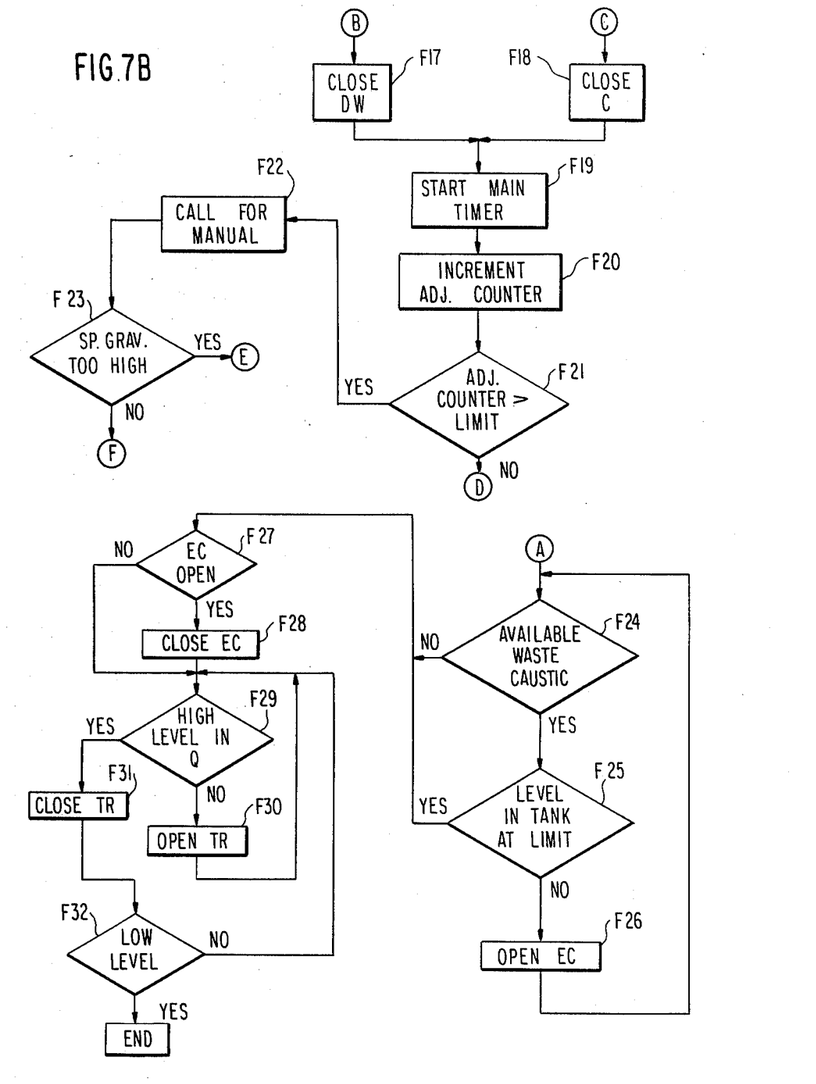

Before describing the operation of the programmable sequencer, in detail, reference is made to FIGS. 7A and B, which is an overall flow diagram of the sequence. As shown in FIGS. 7A and B, the operation begins when the E loop transfer valve is energized to open (Y27). The first function, F1, is to determine if the J tank is empty and its specific gravity is not in specification. Since mixing occurs alternately in the J or the K tank, while mixing is occurring in one tank, the other tank is being used as a source of mixed sodium hydroxide solution. At the beginning of a cascade (signaled by opening of the loop E transfer valve) one or the other of these tanks is always relatively empty (as will be made clear, the low level in this tank is sufficient to cause it to appear to be out of specification). Accordingly then, either the function F2 or F3 is performed to allow either the J or K tank to fill, respectively. Thereafter, the appropriate corresponding function, either F4 or F5 is performed to ensure that the remaining mixing operations occur in the appropriate tank. Function F6 then determines whether or not the level in the appropriate tank has reached the level of the wash level sensor, indicating adequate fill of waste water. Until that occurs, no further operation takes place. However, when it is determined that sufficient waste water is in the tank, then function F7 is performed. Function F7 terminates the waste fill, starts the caustic fill and starts the tank's pump. Thereafter, function F8 is performed, checking via a second level sensor, to determine whether sufficient caustic has been added to the tank. When function F8 indicates sufficient caustic has been added, function F9 is performed to stop the caustic fill and to start a mix timer, for timing out a predetermined period (in one embodiment of the invention that period is three hours). Obviously depending upon the components of the mixture, and the relative volumes employed, the period employed by the mix timer can be increased or decreased. No other operations take place until function F10 of the sequence determines that the mix timer has expired. Thereafter, F11 determines if the specific gravity of the contents of the tank is within the predetermined range. This measurement is effected with the aid of the specific gravity monitor disclosed in the referred to application, although depending upon the particular contents of the mix tank, other specific gravity monitors could be employed. Assuming the specific gravity is within predetermined specifications, then the sequence skips to point A; on the other hand, if the specific gravity is not within specification, then F12 is performed to determine whether the specific gravity is too high or too low.

Depending upon whether the specific gravity is too high or too low one of two sequence branches is performed, either functions F13, F14 or functions F15, F16. Each of these branches allows either a predetermined quantity of fresh dionized water or fresh caustic to be added to the mix tank, and the predetermined quantity is determined by allowing the flow of either the deionized water or caustic to proceed for the period of an adjustment timer. When the adjustment timer is expired, the appropriate one of functions F17 or F18 is performed to close the valve which had been opened at function F13 or F15.

Thereafter, the main timer is again started at F19 and an adjustment counter is incremented at F20. Function F21 tests whether the adjustment counter has exceeded its limit. If the adjustment counter has exceeded its limit no further automatic caustic adjustments are allowed. This ensures that the adjustment process is limited in time, since each adjustment cycle requires a full three hour period of the main timer. In one embodiment of the invention, three adjustments are allowed. Assuming the adjustment limit has not been reached, the sequence returns via point D to wait for expiration of the main timer. In the embodiment now operating, the limitation relates only to caustic fills since, as described the initial parameters are biased so as to normally require caustic fill adjustments.

On the other hand, in the event that the adjustment count limit is reached without the specific gravity falling within the predetermined limits, then function F 22 is performed to call for manual operation. The system operator has available to him a push-button, which, each time it is operated allows a repetition of the automatic adjustment cycle. Accordingly, in the fashion shown in FIGS. 7A and 7B, the cycle can continue until the specific gravity has been appropriately adjusted. Although not shown in FIGS. 7A,B, the operator also has available to him a control to override the out of spec measurement and to induce the controls to "see" an in spec result. In the embodiment of the invention which is described in detail in the remaining portion of this application, the number of manual adjustments allowed is also limited; although it should be apparent, since each manual adjustment requires a manual operation of appropriate push-button, the control system need not impose this restriction.

At any time that function F11 determines the specific gravity to be within the appropriate limits, the sequence skips via point A to function F24. Function F24 checks the level in the waste caustic tank L and assuming there is available waste caustic, function F25 checks whether or not the contents of the tank being mixed is at its limit, which is determined by a third level sensor. Assuming that it is not, the next step in the sequence is F26 to open the EC valve to add waste caustic to the contents of the mix tank. Waste caustic is added until either function F24 indicates no further available waste caustic or function F25 indicates that the mix tank is now full. Thereafter, function F27 determines if the EC valve is open, and if it is, function F28 closes the valve. At this point, functions F29 and F30 are performed to transfer some of the contents of the mix tank to the source or Q tank, from which it is available for use in the process. This transfer proceeds until function F29 indicates that the Q tank is full, and at that point the transfer valve is closed at function F31. Thereafter, function F32 checks the level at the mix tank, and if it has not yet dropped to the lowest of the level sensors (via the fourth sensor), the routine maintains the loop until the level in the mix tank has dropped below the lowest level or the Q tank level drops so that further contents of the mix tank are transferred thereto. When the contents of the mix tank drops below the lowest level, the sequence terminates.

It should be apparent from the foregoing brief description that functions F1 through F23 are capable of operating on one mix tank, while simultaneously functions F24 through F32 are operating on the other mix tank.

In the following description of the operating sequence reference will be made to the condition of various signals or channels. Since the system is binary, only two states are allowed. These will be referred to as a one or high logic level and an other or low logic level. It should be understood that a particular electrical state chosen to represent the one or other logic level can be arbitrarily chosen.

The actual operating sequence for the programmable sequencer is contained in Table III, reproduced below. Table III is actually a portion of the operating sequence for the master control panel programmable sequencer 100; specifically, that portion of the sequence which is pertinent to the mixing effected in tanks J and K; other portions of the sequence are illustrated in the first-referenced application.

The programmable sequencer employs a group of logical instructions such as AND,OR which require no description. The programmable sequencer also responds to a "store" (STR) instruction which directs it to store the designated signal in its accumulator, for logical operations with signals defined in subsequent steps of the sequence. The sequencer also responds to an "out" instruction to place the contents of its accumulator in a designated output channel. In addition to responding to physical inputs and generating physical outputs, the sequencer also generates a number of "control relays"; notwithstanding this designation these "control relays" merely designate reserved memory areas into which the results of logical operation can be stored for later recall in other portions of the sequence. The sequencer can also effect counting and timing operations in a manner well known to those skilled in the art. In addition, and also pertinent to the sequence illustrated in Table III, the sequencer responds to an MCR instruction. This instruction has one of two effects depending upon the concurrent status of the sequencer's accumulator. In the event that an accumulator is in one logic condition a number of output instructions following the MCR instruction which are equal to the quantity associated with the MCR instruction, is forced to a given logical condition, i.e., zero. Thus, notwithstanding the logical condition dictated by the logical processes associated with a following output instruction, the MCR instruction can force a following predetermined number of output instructions to a specific one of the two possible logical conditions. On the other hand, in the event that the accumulator is in its other logical condition at the time the MCR instruction is executed, then the instruction has no effect whatsoever. The MCR instruction therefore can be used to simulate a master control relay which removes power from a predetermined number of simulated output relays, in the event the simulated master control relay is deenergized.

The sequencer program listed in Table III is substantially identical to that in actual use. Because of limited program memory space and the fact that a single sequence is used in the main panel for caustic mixing, as well as cascading, the mixing steps were compressed by writing generalized mixing steps which are applicable for both the mixing tanks. This is feasible since mixing occurs in only one tank at a time. While this has the advantage of saving program memory space it does have the disadvantage of complicating some of the logic. It is within the scope of the invention to simplify the logic (at the expense of program memory) by writing separate program steps to handle each of the different mixing tanks.

TABLE III

| No. | COMMANDS |
|---|---|
| 600 | STR X10 |
| 601 | AND X11 |
| 602 | AND X12 |
| 603 | MCR 52 |
| 604 | |
| 605 | STR Y27 |
| 606 | AND NOT X32 |
| 607 | AND NOT CR372 |
| 608 | OUT Y36 |
| 609 | |
| 610 | STR Y27 |
| 611 | AND X32 |

TABLE III-continued

| No. | COMMANDS |
|---|---|
| 612 | AND NOT X35 |
| 613 | AND NOT CR373 |
| 614 | OUT Y44 |
| 615 | |
| 616 | STR X32 |
| 617 | AND NOT CR372 |
| 618 | OUT CR298 |
| 619 | |
| 620 | STR X35 |
| 621 | AND NOT CR373 |
| 622 | AND NOT CR298 |
| 623 | OUT CR 299 |
| 624 | |
| 625 | STR CR399 |
| 626 | AND CR401 |
| 627 | AND NOT CR372 |
| 628 | AND CR298 |
| 629 | OR Y39 |
| 630 | OR Y33 |
| 631 | OUT Y38 |
| 632 | |
| 633 | STR CR399 |
| 634 | AND CR401 |
| 635 | AND NOT CR373 |
| 636 | AND CR299 |
| 637 | OR Y47 |
| 638 | OR Y41 |
| 639 | OUT Y46 |
| 640 | |
| 641 | STR NOT Y38 |
| 642 | OR Y33 |
| 643 | OR Y39 |
| 644 | AND X32 |
| 645 | OUT Y32 |
| 646 | |
| 647 | STR NOT Y46 |
| 648 | OR Y41 |
| 649 | OR Y47 |
| 650 | AND X35 |
| 651 | OUT Y40 |
| 652 | |
| 653 | STR CR421 |
| 654 | AND CR298 |
| 655 | AND Y79 |
| 656 | OR X30 |
| 657 | OUT Y73 |
| 658 | |
| 659 | STR CR421 |
| 660 | AND CR299 |
| 661 | AND Y79 |
| 662 | OR X33 |
| 663 | OUT Y77 |
| 664 | |
| 665 | STR CR298 |
| 666 | AND CR404 |
| 667 | OR X60 |
| 668 | AND CR401 |
| 669 | OR CR372 |
| 670 | AND X41 |
| 671 | OUT CR372 |
| 672 | |
| 673 | STR CR299 |
| 674 | AND CR404 |
| 675 | ORX61 |
| 676 | AND CR401 |
| 678 | OR CR373 |
| 679 | AND X42 |
| 680 | OUT CR373 |
| 681 | |
| 682 | STR CR372 |
| 683 | AND NOT X30 |
| 684 | AND X36 |
| 685 | OUT Y37 |
| 686 | |
| 687 | STR CR373 |
| 688 | AND NOT X33 |
| 689 | AND X36 |
| 690 | AND NOT Y37 |
| 691 | OUT Y45 |
| 692 | |
| 693 | STR Y37 |

TABLE III-continued

| No. | COMMANDS |
|---|---|
| 694 | OR Y45 |
| 695 | OUT Y31 |
| 696 | |
| 697 | STR CR372 |
| 698 | AND NOT X37 |
| 699 | OUT Y39 |
| 700 | |
| 701 | STR CR373 |
| 702 | AND NOT X37 |
| 703 | AND NOT Y39 |
| 704 | OUT Y47 |
| 705 | |
| 706 | STR CR403 |
| 707 | OR CR405 |
| 708 | AND NOT CR421 |
| 709 | AND CR401 |
| 710 | AND CR298 |
| 711 | AND Y79 |
| 712 | AND NOT CR372 |
| 713 | OR CR372 |
| 714 | OUT Y74 |
| 715 | |
| 716 | STR CR403 |
| 717 | OR CR405 |
| 718 | AND NOT CR421 |
| 719 | AND CR401 |
| 720 | AND CR299 |
| 721 | AND Y79 |
| 722 | AND NOT CR373 |
| 723 | OR CR373 |
| 724 | OUT Y78 |
| 725 | STR X30 |
| 726 | AND CR298 |
| 727 | STR X33 |
| 728 | AND CR299 |
| 729 | OR STR |
| 730 | OUT CR360 |
| 731 | |
| 732 | STR X31 |
| 733 | AND CR298 |
| 734 | STR X34 |
| 735 | AND CR299 |
| 736 | OR STR |
| 737 | OUT CR361 |
| 738 | STR X32 |
| 739 | AND CR298 |
| 740 | STR X35 |
| 741 | AND CR299 |
| 742 | OR STR |
| 743 | OUT CR362 |
| 744 | STR X49 |
| 745 | AND CR298 |
| 746 | STR X54 |
| 747 | AND CR299 |
| 748 | OR STR |
| 749 | OUT CR363 |
| 750 | |
| 751 | STR X50 |
| 752 | AND CR298 |
| 753 | STR X55 |
| 754 | AND CR299 |
| 755 | OR STR |
| 756 | OUT CR364 |
| 757 | |
| 758 | STR X51 |
| 759 | AND CR298 |
| 760 | STR X56 |
| 761 | AND CR299 |
| 762 | OR STR |
| 763 | OUT CR365 |
| 764 | |
| 765 | STR X52 |
| 766 | AND CR298 |
| 767 | STR X57 |
| 768 | AND CR299 |
| 769 | OR STR |
| 770 | OUT CR366 |
| 771 | |
| 772 | STR Y34 |
| 773 | OR Y42 |
| 774 | OUT Y55 |
| 775 | |
| 776 | STR X48 |
| 777 | AND CR298 |
| 778 | STR X53 |
| 779 | AND CR299 |
| 780 | OR STR |
| 781 | OUT CR368 |
| 782 | |
| 783 | STR CR298 |
| 784 | AND CR369 |
| 785 | OUT Y34 |
| 786 | |
| 787 | STR CR299 |
| 788 | AND CR369 |
| 789 | OUT Y42 |
| 790 | |
| 791 | STR CR298 |
| 792 | AND CR370 |
| 793 | OUT Y35 |
| 794 | |
| 795 | STR CR299 |
| 796 | AND CR370 |
| 797 | OUT Y43 |
| 798 | |
| 799 | STR CR298 |
| 800 | AND CR371 |
| 801 | OUT Y33 |
| 802 | |
| 803 | STR CR299 |
| 804 | AND CR371 |
| 805 | OUT Y41 |
| 806 | |
| 807 | STR Y79 |
| 808 | STR CR401 |
| 809 | AND CR365 |
| 810 | AND CR366 |
| 811 | CTR |
| 812 | 15 |
| 813 | + |
| 814 | OUT CR403 |
| 815 | |
| 816 | STR Y79 |
| 817 | STR CR401 |
| 818 | AND NOT CR365 |
| 819 | AND CR366 |
| 820 | CTR |
| 821 | 15 |
| 822 | + |
| 823 | OUT CR404 |
| 824 | |
| 825 | STR Y79 |
| 826 | STR CR401 |
| 827 | AND NOT CR365 |
| 828 | AND NOT CR366 |
| 829 | CTR |
| 830 | 15 |
| 831 | + |
| 832 | OUT CR405 |
| 833 | 1834 |
| STR Y79 | |
| 835 | STR CR401 |
| 836 | AND CR365 |
| 837 | AND NOT CR366 |
| 838 | CTR |
| 839 | 15 |
| 840 | + |
| 841 | OUT CR421 |
| 842 | |
| 850 | STR CR362 |
| 851 | AND NOT CR399 |
| 852 | STR NOT CR398 |
| 853 | AND CR401 |
| 854 | AND CR405 |
| 855 | STR CR398 |
| 856 | AND CR411 |
| 857 | AND CR407 |
| 858 | OR STR |
| 859 | AND NOT CR406 |
| 860 | AND NOT CR410 |
| 861 | OR STR |
| 862 | AND NOT CR360 |

TABLE III-continued

| No. | COMMANDS |
|---|---|
| 863 | OUT CR369 |
| 864 | |
| 865 | |
| 866 | STR CR361 |
| 867 | OR CR399 |
| 868 | AND NOT Y36 |
| 869 | AND NOT Y44 |
| 870 | OUT CR399 |
| 871 | |
| 872 | |
| 873 | STR Y79 |
| 874 | STR NOT CR400 |
| 875 | CTR |
| 876 | 30 |
| 877 | + |
| 878 | OUT CR400 |
| 879 | |
| 880 | |
| 881 | |
| 882 | |
| 883 | STR CR399 |
| 884 | AND CR400 |
| 885 | STR NOT CR406 |
| 886 | AND CR 362 |
| 887 | CTR |
| 888 | 179 |
| 889 | + |
| 890 | STR CR411 |
| 891 | AND CR398 |
| 892 | OR STR |
| 893 | OUT CR401 |
| 894 | STR CR399 |
| 895 | AND CR 401 |
| 896 | AND CR403 |
| 897 | STR CR399 |
| 898 | AND CR411 |
| 899 | AND CR408 |
| 900 | OR STR |
| 901 | AND NOT CR406 |
| 902 | AND NOT CR410 |
| 903 | AND NOT CR360 |
| 904 | OUT CR370 |
| 905 | |
| 906 | STR Y42 |
| 907 | OR Y43 |
| 908 | OR Y34 |
| 909 | OR Y35 |
| 910 | AND Y79 |
| 911 | STR CR399 |
| 912 | AND NOT CR406 |
| 913 | CTR |
| 914 | 119 |
| 915 | + |
| 916 | OUT CR406 |
| 917 | |
| 918 | STR CR401 |
| 919 | STR CR362 |
| 920 | CTR |
| 921 | 3 |
| 922 | + |
| 923 | OUT CR398 |
| 924 | |
| 925 | STR CR363 |
| 926 | AND CR399 |
| 927 | OR CR407 |
| 928 | AND CR401 |
| 929 | OUT CR407 |
| 930 | |
| 931 | STR CR364 |
| 932 | AND CR399 |
| 933 | OR CR408 |
| 934 | AND CR401 |
| 935 | OUT CR408 |
| 936 | |
| 937 | |
| 938 | STR CR363 |
| 939 | OR CR364 |
| 940 | AND CR399 |
| 941 | AND CR401 |
| 942 | OUT CR409 |
| 943 | |
| 944 | |
| 945 | STR CR411 |
| 946 | OR CR409 |
| 947 | AND NOT CR406 |
| 948 | OUT CR411 |
| 949 | |
| 950 | STR CR368 |
| 951 | OR CR371 |
| 952 | AND NOT CR402 |
| 953 | OUT CR371 |
| 954 | |
| 955 | |
| 956 | STR CR371 |
| 957 | AND CR400 |
| 958 | STR CR368 |
| 959 | CTR |
| 960 | 10 |
| 961 | + |
| 962 | OUT CR402 |
| 963 | |
| 964 | |
| 965 | STR CR404 |
| 966 | OR CR410 |
| 967 | AND CR401 |
| 968 | OUT CR410 |
| 969 | |
| 980 | STR CR398 |
| 981 | AND NOT CR372 |
| 982 | OUT Y72 |

The instructions 600 through 603 comprise an MCR instruction which checks the condition of the input channels X10, X11 and X12; reference to Table I indicates that these check the availability of power at the J and K mix tank panels and the M/L tank panel. If power is not available at any one of these panels it would not be appropriate to attempt to open or close valves and therefore, if any of the channels X10, X11, or X12 indicate the lack of of power, the MCR instruction forces the fifty-two following output instructions to the zero logical state.

Instructions 616 through 618 and 620 through 623 are mutually exclusive in that they select either CR298 or CR299 for the one logical state and require the other to be the converse. These control relays are employed in other processing steps to operate either on the J tank or the K tank. Instructions 616 and 617 examine the input channel X32 and a control relay 372. Input channel X32 is the wash level sensor in the J tank, and is closed whenever the waste wash media volume has been transferred to the J tank. Control relay 372, as will later be described, indicates when it is closed, that the solution in the J tank is within the nominal specific gravity range. Thus, tank J is selected when its liquid level is lower than the wash level sensor and its specific gravity is out of spec. On the other hand, reference to lines 620 through 623 indicates that tank K is selected if its liquid level is below the wash level sensor, its specific gravity is not in spec, and tank J has not been selected.

A similar selection is made in instructions 605 through 608 and 610 through 614 to open either the tank J or tank K WW valve; when open, waste wash media is allowed to enter the associated tank. With respect to the valve JWW, the instruction requires that the tank have a liquid level below that required for wash media, that its specific gravity not be in specification and that the loop E pump be on. The logic for the valve KWW uses corresponding inputs, but also requires that tank J have at least a liquid level exceeding its wash level sensor (X32).

Accordingly, when the loop E pump comes on, the valve JWW will be opened assuming the tank is relatively empty and its contents do not meet the specific gravity requirements. On the other hand, the valve KWW will be selected under similar circumstances with the additional requirement that the J tank have at least a minimum level therein.

Instructions 625 through 631 and 633 through 639 control the valves JCV or KCV. It should be noted that the valves JCV and KCV are normally open, and are only closed when their associated output channels (Y38 or Y46) are set to a one logic state. For the valve JCV to be closed tank J has to be selected (CR298) and as will become clear, the three hour timer (CR401) must be expired. In the alternative, the tank J transfer valve must be open, or tank J drain valve must be open. If any one of these conditions are met the circulate valve is closed, otherwise the valve is open.

Lines 641 through 645 and lines 647 through 651 control the J and K tank pumps (channels Y32 and Y40). As shown, the J tank pump will be energized only when the wash wash level sensor X32 indicates there is at least a wash level in the tank. The circulate valve must also be opened, or the drain or transfer valves must be open. Thus, if one of these three valves is open and there is at least a minimum amount of level in the tank, the pump comes on.

Lines 653 through 657 and 659 through 663 control an output indication (Y73 and Y77, respectively), which can indicate high liquid level in the associated tank and/or a specific gravity probe failure if the indicator flashes. Taking up the Y73 indicator as typical, it will be energized if input X30 is high, and this represents a high liquid level in the J tank. An alternate energization path for the output indicator is provided through control relay 421, control relay 298 and output channel Y79. The latter output channel is, as is more completely explained in the West application Ser. No. 162,544, used in the timing sections, and produces a one second pulse with a 50% duty cycle. Control relay 421 as will be explained hereinafter, indicates a probe failure.

Lines 665 through 671 and 673 through 680 generate an indication that the associated tank's specific gravity is within proper specification. Taking up control relay 372 as typical, the output is in a high logic level condition in one of three circumstances; either (1) the output is in its one logic level condition and the lowest level sensor (X41) is in its one logical condition (lines 669, 670) or (2) channel X60, which is the manual in spec override, is in its one logic level state, the lowest level sensor (x41) is in its one logic state and control relay 401 is in its one logic state at the end of that three hour period (lines 667,668 and 670). Finally, (3) if a low liquid level sensor and the timer are both in their one logic state (CR401,X41) and the appropriate tank has been selected (CR298) and control relay 404 is in its one logic state (indicating appropriate specific gravity measurement) then the control relay 372 is set to its one logic state (lines 665,666,668 and 670).

Lines 682 through 685 and 687 through 691 control the EC valve (either output channels Y37 or Y45). To energize output channel Y37, the sequence requires that the J tank be in specification (CR372), that the highest liquid level sensor in the tank cannot be in its zero logic state (not x30) and that the source of waste caustic (tank L) be above a certain minimum level (X36). The requirements for output channel Y45 are similar except that it also requires the output channel Y37 to be in its low logic state.

If either output channel Y37 or Y45 is set to its one logic state to thereby open the appropriate EC valve, then the pump (output channel Y31 is also energized.)

Lines 697 through 699 and 701 through 704 control the transfer valve. This valve is simply open when the appropriate tank is in specification, and the source tank, to which a transfer is to be effected, indicates a liquid level less than a high liquid level (X37). In addition, output channel Y47 requires that output channel Y30 not be in its one logic state; therefore ensuring that only one transfer valve is open.

Lines 706 through 714 and 716 through 724 control output channels Y74 and Y78, respectively, which in the one logic state indicate the associated tank's specific gravity is within specifications. On the other hand, when flashing these indicators indicate the contents are not in specification, when dark, the tank is not mixing.

Sequence lines 725 through 73,732 through 737, 738 through 743, 744 through 749,751 through 756, 758 through 763 and 765 through 770 relate respectively to control relays 360,361,362,363,364,365 and 366 which indicate a high liquid level in the mixing tank, the completion of the initial caustic fill, completion of the waste water fill, selection of manual caustic addition, selection of manual addition of deionized water, high specific gravity and low specific gravity, respectively. To set the control relay in each one of these logic combinations to its high logic level requires the appropriate selection control relay (298 for tank J and 299 for tank K) to be in its high logic state, coupled with a high logic state of the appropriate input channel; for example channel X30 indicates high liquid level in tank J, X33 indicates high liquid level in tank K.

Lines 772 through 774 relate to the fresh caustic pump P39 which, as is shown, is energized whenever the C valve Y34 or Y42 is in its high logic state.

Lines 776 through 781 relate to a manual drain button control relay which can be set to a high logic level condition when channel X48 or channel X58 (connected to a manual drain pushbutton for the J and K tanks, respectively) is in its high logic level condition.

Lines 783 through 785 and 787 through 789 control valves JC and KC (channels Y34 and Y42); and require, in addition to the tank select control relay (either CR298 or CR299) the control relay 369, to be set to its high logic level. Control relay 369 is discussed hereinafter.

Lines 791 through 793 and 795 through 797 control the DW valves, channels Y35 and Y43; and coperate in conjunction with control relay 370, the development of which will be discussed hereinafter. Similarly, lines 799 through 801 and 803 through 805 relate to the J and K DV valves, Y33 and Y41, respectively; and operate in conjunction with control relay 371 which will be discussed hereinafter.

Lines 807 through 815, 817 through 823, 825 through 832 and 834 through 841 relate to the control relays 403,404,405 and 421; relating specifically to a high specific gravity condition, correct specific gravity condition, low specific gravity condition or a probe failure, respectively.

Taking up control relay 403, for example, lines 811 through 813 provide a counter which provides a high logic level on its output, to drive the control relay to its high logic level, after a count of 15. The counter is set every second by Y79 (line 807) and will rapidly count to a count of 15 in the event that the control relays 365,366 and 401 are all in their one logic state. As will be described hereinafter, the control relay 401 is the output of the three hour timer, control relays 365,366 have already been described. Although the control relays 365,366 simply repeat the contact conditions of the specific gravity probe, the sequence employs the count of 15 counter to eliminate reacting to spurious contact conditions caused by, for example, contact bounce, etc. Furthermore, the specific gravity is detected by the closure, in different combinations of two pairs of contacts X51 and X52 for the tank J, and X56 and X57 for the tank K. When both pairs of contacts are open, the probe is detecting a low specific gravity condition. If this condition is stable for 15 seconds CR405 is set to the logic one condition. When only one contact is closed (X57 or X52) and that condition is stable over the period of the counter 15 counter, then control relay 404 is set to its high logic state and correct specific gravity is indicated. On the other hand, if the contacts (X51 and X52 or X56 and X57) are both in their closed condition, that is interpreted as high specific gravity condition. Finally, if contacts X51 or X56 are closed and contacts X52 or X57 are opened, that is a non-allowed combination and interpreted as a probe failure thereby setting control relay 421 to its high logic level state.

Lines 850 through 863 establish control relay 369 which, when its in its high logic level state, calls for additional caustic. There are three possible conditions; and all call for control relay 360 to be in low logic state (since if in its high logic level state it indicates the mixing tank is full). Assuming that the tank is not full, however, control relay 369 can be set to its one logic state if CR399 is in its low logic state. Control relay 362 in its one logic state indicates that cascade wash water has been added. Control relay 399 indicates that the sequence will allow additional caustic to be added automatically (development of this relay is discussed hereinafter). A second situation allowing the automatic addition of fresh caustic is when control relays 398,406 and 410 are in their low logic state and control relay 401 and 405 are in their high logic state. Control relay 398 is the automatic adjustment counter (corresponding to function F20 in FIG. 7B and thus, is in its high logic state only after three automatic adjustments. Control relay 406 is the adjustment timer and control relay 410 indicates the specific gravity is in specification. Accordingly, all these control relays must be in their low logic state to allow automatic adjustment. In addition, control relays 401 and 405 must be in their one logic state; control relay 401 being the three hour timer and control relay 405 indicating low specific gravity. Finally, a third condition allowing the automatic adjustment requires control relays 398, 407 and 411 to be in their one logic state and control relays 406 and 410 to be in their low logic state. This condition applies after the three automatic adjustments have expired, control relay 407 indicating a manual adjustment.

Lines 866 through 870 relate to control relay 399, which when in its one logic state prevents automatic caustic addition until the associated tank is empty. This can be set if, after control relay 361 is in its one logic state both the WW valves are closed. Once set to its one logic state the control relay 399 will remain there until one or the other of the WW valves is opened, and since these valves will only be open when a tank is empty, once the control relay 399 is set to its one logic state, it cannot be reset until one or the other of the waste water valves is opened.

Lines 873 through 878 merely provide for a one minute pulse by counting 30 cycles of the one second on and one second off duration of Y79. This one minute pulse is used in lines 883 through 894 which provide the three hour mixing timer. Lines 887 through 889 provide for a counter of 179, and by arranging the input to be provided with one minute pulses, the counter is arranged to count to a count of 180 corresponding to 180 minutes or three hours. Thus, the counting input of the counter is the conjunction of CR399 and CR400, the former being set to the one logic state after sequential fills by waste water and initial caustic, the latter being a one minute pulse. When the counter reaches a count of 180,CR401 is set to its one logic state, and will remain there until reset by the conjunction of CR362 and the low logic state of CR406, the adjustment timer. CR362 is in its one logic state after the initial waste water is added. CR401 can also be set to the one logic state in the conjunction of CR398 and CR411. CR398 is the automatic adjustment counter, which is set to its one logic state after three automatic adjustments and CR411 indicates manual adjustment, and thus, under these circumstances the CR401 is set to its one logic state.

Lines 896 through 906 provide for CR370 which is used to open the DW valves at line 792 or 796. CR370 can be set to the one logic state in one of two circumstances; firstly, CR399, CR401 and CR403 in their one logic state, in conjunction with CR406, 410 and 360 at zero logic state. CR360 indicates high liquid level and this must be in its low logic state to operate CR370. In addition, CR410 which indicates that the tank contents are in specification must be in its low logic state and finally, CR406, the adjustment timer must be in its low logic state. Under the circumstances then, if CR399 is in its one logic state (indicating that the initial caustic load has been effected) and CR401 is in its one logic state (indicating a high specific gravity measurement) then CR370 can be set to its one logic state. In the alternative, if CR411 and CR408 are in their one logic state, then CR370 can be set to its one logic state. CR411 indicates a manual adjustment, and CR408 indicates that it is the deionized water pushbutton which has been selected.

Lines 908 through 916 provide for CR406 which is an adjustment timer. This is used to reset the three hour timer in the event automatic or manual adjustment is desired and times the adjustment (caustic or water) flow. This is effected by ORing channel Y34, Y42, Y43 and channel Y35 to indicate either the DW or C valves are open, and chopping these into one second pulses using Y79. When this condition is maintained for two minutes (or counting 120 one second pulses) CR406 is set to the one logic state. The timer is immediately reset by lines 911 and 912.

Lines 918 through 923 provide for CR398 which is the automatic adjustment counter which counts three automatic adjustments and is then set to its logic one state. The counting input to this counter is CR401 which is a three hour timer and it is reset by CR362 on the initial waste water loading of the mixing tank. Thus, each time the timer expires, the counter is incremented once, and when it counts to three CR398 is set to the one logic state.

Lines 925 through 929 and 931 through 935 provide for CR407 and CR408 respectively, the manual caustic addition and the manual water addition. Each of these requires that CR399 and CR401 be in their one logic state, the first indicating the initial caustic load and the second indicating that the three hour timer has expired, and CR363 or CR364 indicating operation of the manual caustic or water pushbutton. Once set to their one logic state, they are maintained there until CR401, the three hour timer is set to its zero logic state (i.e., reset). Lines 938 through 942 provide for CR409, which is in its one logic state after the initial caustic load when the three hour timer has expired and in the event either the manual caustic or manual water pushbutton is operated. This is used in conjunction with lines 945 through 948 to operate CR411 which can only be set to its one logic state when CR409 is in its one logic state and CR406 (the adjustment timer) is in its zero logic state. Once CR411 is set to its one logic state, it is maintained there until the adjustment timer becomes set. This ensures that the adjustment timer is set when the main timer is expired. As we saw, the set condition of the adjustment timer, when the main timer has expired, will reset the main timer.

Lines 950 through 953 provide for CR371 which can initiate the drain timer; it can be set to its one logic state only when CR368 is in its one logic state (and it is in that state when the manual drain pushbutton is operated). Once it is set to that state it remains there until the drain timer is set to its one logic state (i.e., the drain timer expires).

The drain timer is effected by lines 956 through 962. The drain timer counts ten one minute pulses, and, once set to its one logic state forces CR371 to its zero logic state to open the drain valve.

Lines 965 through 968 provide for CR410 which indicates the tank contents are in specification. This is effected by ANDing CR404 (indicating specific gravity in specification) and expiration of the three hour timer, CR401. Once in its one logic state, it is maintained there until the three hour timer is reset.

Finally lines 980–982 provide for Y72 which, when in a one logic state calls attention to the need for manual operation.

What is claimed is:

1. In a process of battery manufacture which includes the steps of washing a partially completed battery component with water and which includes a further step employing a sodium hydroxide solution, the improvement comprising the method of reusing waste water from said washing step, comprising the automatically effected steps of:
   (a) transferring a determined quantity of said waste water to a mix tank;
   (b) adding a determined quantity of a sodium hydroxide solution;
   (c) circulating the contents of said mix tank for a predetermined time;
   (d) monitoring specific gravity of said mix tank contents at least after circulating said mix tank contents for a predetermined time,
   (e) selectively adding a further determined quantity of water or sodium hydroxide solution if said monitored specific gravity is not within a selected range, or
   (f) transferring said mix tank contents to a source of battery treatment sodium hydroxide solution if said monitored specific gravity is within said selected range, and
   (g) repeating said steps (e), (c) and (d) each time said step (d) indicates that said specific gravity is not within said selected range.

2. The method of claim 1 wherein step (e) comprises selectively adding either a further determined quantity of water or sodium hydroxide solution depending upon whether said specific gravity is above said selected range or below said selected range.

3. The method of claim 1 or 2 in which said waste water is derived from a valved pipeline and in which said method is initiated when said valve in said valved pipeline is opened.

4. The method of claim 3 which includes the initial step of
   selecting said mix tank to which said waste water is to be transferred, in said step (a) from among at least first and second mix tanks by selecting said first tank unless a liquid level in said first tank is above a first level.

5. The method of claim 3 in which said valved pipeline carries waste water in excess of said determined quantity of waste water, and in which said method includes the step of transferring said excess waste water to a further tank.

6. The method of claim 1 in which said process includes a washing step employing a NaOH solution from which waste NaOH solution is available from a source of waste NaOH and which includes the further step prior to effecting said step (f), of
   (h) transferring to said mix tank a quantity of a waste NaOH solution in dependence on level sensors in said mix tank and in said source of waste NaOH.

7. The method of claim 6 in which said step (h) is terminated on reaching a fixed level of said mix tank.

8. An apparatus for reusing waste water generated in a battery manufacturing process which includes a plurality of sources of wash media of differing impurity conenntration spquentially tapped to fill a plurality of wash tanks and from at least one of said sources a fixed quantity of waste water is discharged on a quasi-periodic basis comprising:
   (a) a mix tank;
   (b) first means for transferring a determined quantity of said waste water to said mix tank;
   (c) second means, responsive to said first means, for transferring a determined quantity of a caustic solution to said mix tank,
   (d) mixing means responsive to said second means for mixing the contents of said mix tank,
   (e) specific gravity monitoring means for signaling the attainment of a specific gravity in said mix tank within a determined range,
   (f) transfer means, responsive to attainment of a specific gravity within said determined range for, on demand, transferring at least some of the contents of said mix tank to a source tank,
   (g) timing means initiated by energization of said mixing means for marking the termination of a fixed period of time;
   (h) fresh water supply means;
   (i) fresh NaOH supply means;
   (j) selection means, responsive to expiration of said fixed period of time in the absence of said signal from said specific gravity monitoring means for enabling a one or the other of said fresh water supply means or said fresh NaOH supply means, and (k) means responsive to operation of said selection means for resetting said timing means and for energizing said mixing means.

9. The apparatus of claim 8 in which said monitoring means further provides a low or high signal indicating measurement of a low or high specific gravity relative to said determined range; and in which said selection means enables said fresh NaOH supply means in the presence of said low signal and said fresh water supply means in the presence of said high signal.

10. The apparatus of claim 8 which includes a counter means, comparator means for comparing the contents of said counter means to a fixed number and outputting an exceed signal if the contents of said counter exceeds said fixed number, means for incrementing said counter means each time said selection means enables said fresh water or NaOH supply means, means for inhibiting operations of said selection means when said comparator means produces said exceed signal, and means for resetting said counter means on each operation of said first means.

* * * * *